United States Patent [19]

Kubis et al.

[11] Patent Number: 4,863,011
[45] Date of Patent: Sep. 5, 1989

[54] AUTOMATIC ARTICLE UNLOADER
[75] Inventors: Charles S. Kubis, Palos Heights; John Walter, Evergreen Park, both of Ill.
[73] Assignee: Continental Can Company, Inc., Norwalk, Conn.
[21] Appl. No.: 207,499
[22] Filed: Jun. 16, 1988
[51] Int. Cl.⁴ .............................................. B65G 47/34
[52] U.S. Cl. .................... 198/705; 198/476.1; 414/417
[58] Field of Search .................. 198/705, 482.1, 476.1, 198/477.1, 802; 414/417

[56] References Cited
U.S. PATENT DOCUMENTS

| | | | |
|---|---|---|---|
| 2,181,603 | 11/1939 | Long | 198/802 |
| 2,652,791 | 9/1953 | Liston | 198/482.1 |
| 3,565,232 | 2/1971 | Cadwallader | 198/476.1 |
| 3,894,630 | 7/1975 | Shank, Jr. | 198/476.1 X |
| 3,998,030 | 12/1976 | Straub | 198/802 X |
| 4,116,325 | 9/1978 | McDonald | 198/482.1 |

FOREIGN PATENT DOCUMENTS 01491134  9/1982  Japan ................. 198/482.1

Primary Examiner—Robert J. Spars
Assistant Examiner—James R. Bidwell
Attorney, Agent, or Firm—Charles E. Brown; Paul Shapiro; Charles A. Brown

[57] ABSTRACT

This relates to the removal of articles from a nest which is travelling along a predetermined path. Most particularly, nests are mounted on an endless conveyor chain and carried thereby past various stations for forming a package beginning with a container, a product placed in the container, and finally a lid. This particularly relates to the removal of such a article as the afore described package. Each nest is provided with a pad or plate in the bottom thereof to be positioned below the container. The plate is carried by a plunger which projects downwardly through the bottom of the nest and also through the conveying chain. In accordance with this invention, the lower end of the plunger engages a ramp which pushes the plunger upwardly as the nest travels along a predetermined path to lift the package out of the nest. The nests are removably mounted on pins of the chain and in order to prevent undesired upward movement of the nests relative to the chain, there are also provided holddowns disposed on opposite sides of the path of the nests for engaging a smooth upper surface of each nest to hold it down as the plunger is being lifted by the ramp.

2 Claims, 1 Drawing Sheet

AUTOMATIC ARTICLE UNLOADER

This invention relates in general to useful improvements in the formation of containers and more particularly to the unloading of a package defined by the container after the container has been closed and sealed.

There has been developed by us and more particularly defined in co-pending applications, a container filling and closing system wherein a container is seated in a nest carried by an endless chain and wherein the container is first filled with a product, after which a lid is applied and sealed to the container. The resultant package is contained in the nest and in accordance with this invention is automatically removed from the nest as the nest moves towards a position for receiving an empty container.

Inasmuch as the nest is fully supported by the conveying chain, the resultant package may be readily removed from the nest by providing the nest with a pad which is carried by an elongated plunger that extends down through the nest. While the nest is restrained against upward movement, the plunger engages a ramp so as to lift a pad with the result that the package is lifted out of the nest and is in a position for take away by a suitable take away device which is not part of this invention.

With the above and other objects in view that will hereinafter appear, the nature of the invention will be more clearly understood by reference to the following detailed description, the appended claims and the several views illustrated in the accompanying drawings.

IN THE DRAWINGS

Figure 1:
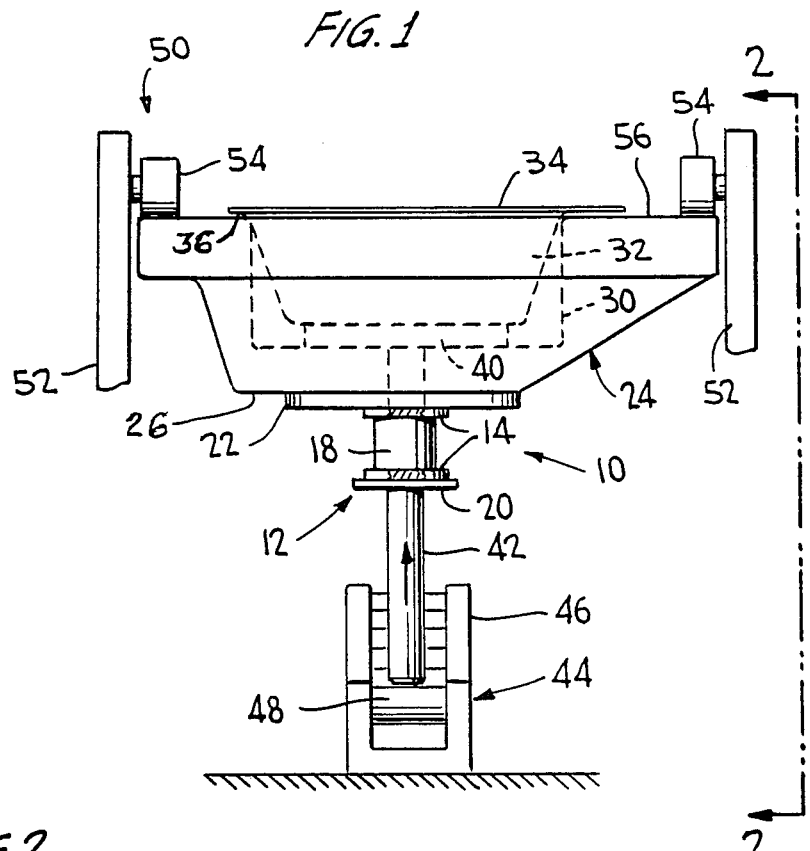
FIG. 1 is a vertical sectional view taken through an endless conveyor chain which supports in series nests and shows apparatus for automatically removing packages formed in such nests from the nests.

Referring now to the drawings in detail, it will be seen that there is illustrated a portion of a special endless conveying chain generally identified by the numeral 10. The chain 10 per se is not a part of this invention but is disclosed in other co-pending applications. The chain 10 is formed of a plurality of pairs 12 of elongated links which are joined together by pairs of short links 14 in a conventional manner. Pins 16 pivotally join the short links 14 to the elongated links. The pins 16 carry between the short links sprocket teeth engaging rollers 18 which also serve as spacers for the short links 14. The pins 16 project above the chain 10 for a purpose to be described hereinafter.

Figure 2:
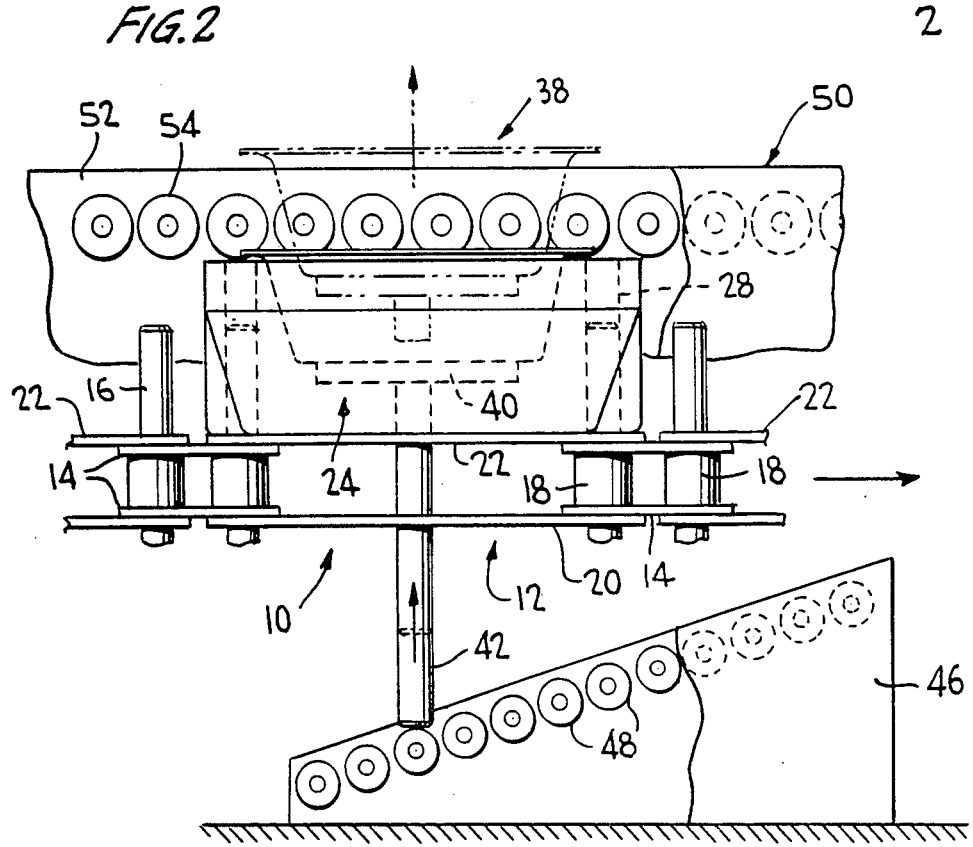
FIG. 2 is a fragmentary side elevational view with parts broken away and shown in section tken generally along the line 2—2 of FIG. 1 and shows further details of the nest and the apparatus for automatically removing packages from the nest.

At this time it is particularly pointed out, as is best shown in FIG. 2, that each pair 12 of elongated links includes a lowermost strap-like link 20 and an upper link 22, the upper link 22 having an enlarged central portion which defines a supporting surface.

It is intended in use that a nest 24 be carried by each of the chain links 22 with each nest 24 having a base 26 which is seated on a respective chain link 22. Further, each nest 24, as is best shown in FIG. 2, is provided with a pair of vertical bores 28 which receive the pins 16. Thus each nest 24 is freely seated on a respective link 22 for ease of removal such as for replacement, cleaning, etc.

Each nest 24 is provided with a cavity 30 for receiving a container 32 which is preferably in the form of a carton. The container 32, while seated in the nest 24, will have a product placed therein, after which a lid 34 will be seated on to a flange portion 36 of the container 32 and bonded thereto to form a complete package, generally identified by the numeral 38.

This invention in particular has to do with the automatic removal of the package 38 from the nest 24 as the nest 24 moves along with and is conveyed by the chain 10.

To the aforesaid end, there is mounted in the cavity 30 a pad or support plate 40 which is carried by adepending plunger 42. The plunger 42 passes down through the bottom of the nest 24 and also through a central part of the chain links 20, 22 as is shown in FIG. 2 so that the lower end of the plunger 42 depends a considerable distance below the chain 10. By moving the plunger 42 upwardly, the plate 40 will lift the package 38 and when lifted sufficiently, the package 38 will move entirely out of nest and may be removed from the plate 40 by any conventional take away mechanism (not shown).

At this time it is pointed out that the container 32 may be initially seated on the plate 40 or may be seated on the base of the cavity 30 above the plate 40.

In order that the package 38 may be removed from the nest 24, there is provided a simple ramp 44 which is in alignment with the path of movement of the chain 10 and thus the path of movement of the plunger 42. The ramp 44 is centered on a plane through the path of movement of the chain 10.

In the illustrated embodiment, the ramp 40 includes a suitable support 46 carrying a plurality of rollers 48. However, the ramp is not restricted to rollers 48, but may have merely a low friction sliding contact.

While the ramp 44 may provide the necessary upward movement of the plunger 42 to lift the plate 40 and thus the container 38 the desired height, it is pointed out here that there are times when the package 38 may stick within the cavity 30. Accordingly, means must be provided for maintaining each nest 24 against vertical movement. To this end, there is provided hold down means generally identified by the numeral 50. The hold down means 50 is preferably divided into two parts, one on each side of the path of movement of the nest 24. In the illustrated embodiment of the hold down means 50, there is on each side of the path of movement of the nest 24 a suitable support 52 and this support carries a series of rollers 54 which are positioned to engage the upper surface of the nest 24. At this time it is pointed out that the nest 24 does have a smooth upper surface 56 for engagement by the rollers 54 or any other type of sliding contact which will permit freedom of movement of the nest 24 with the chain 10 while engaging the hold down means 50.

Preferably the hold down means 50 is of a greater longitudinal extent than the ramp 44 so that the nest 24 will be restrained against vertical movement prior to the plunger 42 engaging the ramp 44. Also, it is preferred that the hold down means 50 extend beyond the ramp 44 so as to maintain the nest 24 against tilting during the removal of a package 38 from the nest.

At this time it is pointed out that while only one nest 24 has been illustrated in FIG. 2, it is to be understood that normally the chain 10 will carry a nest 24 on each of the links 22.

Although only a preferred embodiment of the automatic article unloader has been specifically illustrated and described herein, it is to be understood that minor variations may be made in the construction and usage of the unloader, including unloading articles other than packages, without departing from the spirit and scope of the invention as defined by the appended claims.

We claim:

1. An automatic article unloader for removing an article from a travelling nest, said article unloader comprising said nest having an article receiving cavity, a support seated in a bottom part of said cavity, a plunger carrying said support extending downwardly from and below said nest, conveying means for effecting movement of said nest along a predetermined path, a ramp positioned along said path in position to be engaged by said plunger to automatically elevate said plunger and said support as well as any article positioned in said nest to remove such article from said nest as said nest moves along said path, and fixed hold down means separate from said conveying means for engaging said nest and preventing vertical movement of said nest as said nest is passing over said ramp.

2. An automatic article unloader according to claim 1 wherein said nest has a smooth upper surface for engagement by said hold down means.

* * * * *